(12) United States Patent
Kyllmann et al.

(10) Patent No.: US 7,737,835 B2
(45) Date of Patent: Jun. 15, 2010

(54) HAND HELD TIRE PRESSURE MONITORING SYSTEM

(75) Inventors: Alexander Leopold Kyllmann, Jalisco (MX); Fabian Gallardo-Vazquez, Jalisco (MX); Victor Rodrigo Jauregui Sandoval, Jalisco (MX); Ricardo Montes-Perez, Jalisco (MX); Jorge Antonio Vazquez-Murillo, Jalisco (MX); Eduardo Zenteno-De Los Santos, Jalisco (MX)

(73) Assignee: Siemens VDO Automotive, S.A. De C.V., Ulajomulco De Zuniga Jalisco (MX)

( * ) Notice: Subject to any disclaimer, the term of this patent is extended or adjusted under 35 U.S.C. 154(b) by 378 days.

(21) Appl. No.: 11/769,999

(22) Filed: Jun. 28, 2007

(65) Prior Publication Data
US 2008/0001729 A1    Jan. 3, 2008

Related U.S. Application Data

(60) Provisional application No. 60/817,587, filed on Jun. 29, 2006, provisional application No. 60/817,586, filed on Jun. 29, 2006, provisional application No. 60/817,585, filed on Jun. 29, 2006.

(51) Int. Cl.
*B60C 23/00* (2006.01)
*G09F 9/00* (2006.01)
*G08B 25/00* (2006.01)

(52) U.S. Cl. ............. 340/442; 340/445; 340/447; 340/461; 340/525; 73/146.5

(58) Field of Classification Search .......... 340/442
See application file for complete search history.

(56) References Cited

U.S. PATENT DOCUMENTS

| | | | |
|---|---|---|---|
| 6,243,007 B1* | 6/2001 | McLaughlin et al. | 340/447 |
| 6,868,718 B1* | 3/2005 | Hui et al. | 73/146 |
| 2002/0130771 A1* | 9/2002 | Osborne et al. | 340/438 |
| 2006/0012470 A1* | 1/2006 | Chakam et al. | 340/445 |

* cited by examiner

*Primary Examiner*—Donnie L Crosland (57) ABSTRACT

A tire pressure monitoring system includes a plurality of tire pressure monitoring devices mounted within corresponding tires that transmit information to a handheld receiver that is mounted and supported within a cradle of a vehicle cabin. The handheld device is removable from the cradle to reveal a primary display that communicates specific information regarding the conditions of the system and individual tires. The remote handheld device can also be utilized to prompt a tire pressure monitoring device to display temperature compensated pressure measurements in real time during tire inflation.

22 Claims, 7 Drawing Sheets

HAND HELD TIRE PRESSURE MONITORING SYSTEM

CROSS REFERENCE TO RELATED APPLICATION

This application claims priority to U.S. Provisional Application Nos. 60/817,587, 60/817,586 and 60/817,585 which were all filed on Jun. 29, 2006.

BACKGROUND OF THE INVENTION

This invention generally relates to a tire pressure monitoring system. More particularly, this invention relates to a tire pressure monitoring system for a vehicle including a hand held monitoring device.

Current tire pressure monitoring systems require prior programming of tire position in order to properly identify a tire with a problem. Such prior programming is not a huge burden for vehicles with only four wheels. However, larger vehicles with multiple dual tire axles require greater effort to program, maintain and identify each tire pressure sensor with a tire position. Conventional systems may utilize additional antennas to determine tire position at increased cost and complexity. Other systems require a disciplined continual updating of tire position on the vehicle.

Additionally, tire pressure is a temperature sensitive variable that complicates even the simple process of inflating a tire to a proper pressure. The tire pressure monitoring sensors can compensate for temperature; however, during inflation instant access to the temperature compensated tire pressure is not available when the tire pressure readout is disposed within a vehicle cabin.

Additionally, current tire pressure monitoring systems continually gather data indicative of current tire conditions. Not all this data is required by the operator at all times. Only certain specific levels of data are required to be communicated to the operator dependent on current conditions and the preference of the vehicle operator.

SUMMARY OF THE INVENTION

An example system for monitoring conditions within a tire includes a plurality of tire pressure monitoring devices mounted within corresponding tires that transmit information to a handheld receiver that is mounted and supported within a cradle of a vehicle cabin.

The example hand held receiver is supported within the cradle, and the cradle is in turn mounted within the vehicle cabin. The cradle provides power to the handheld device and communication with an antenna mounted within the vehicle. The antenna receives information from the various tires pressure monitoring devices mounted within each of the tires of the vehicle.

The example handheld device includes a warning display that is visible while the handheld receiver is mounted and supported within the cradle of the vehicle. The warning display communicates overall conditions within the tires of the vehicle. The conditions of the tire are indicated as either being within or outside desired parameters. No tire specific information is displayed by the warning display, only the information that the driver needs while operating the vehicle.

The handheld device is removable from the cradle to reveal a primary display that communicates specific information regarding the conditions of the system and individual tires. Once the operator decides to remedy the situation, the handheld receiver is removed from the cradle and taken outside of the vehicle to determine what tire is encountering problems. The remote handheld device can also be utilized to prompt a tire pressure monitoring device to display temperature compensated pressure measurements in real time during tire inflation.

These and other features of the present invention can be best understood from the following specification and drawings, the following of which is a brief description.

DETAILED DESCRIPTION OF THE PREFERRED EMBODIMENT

Figure 1:
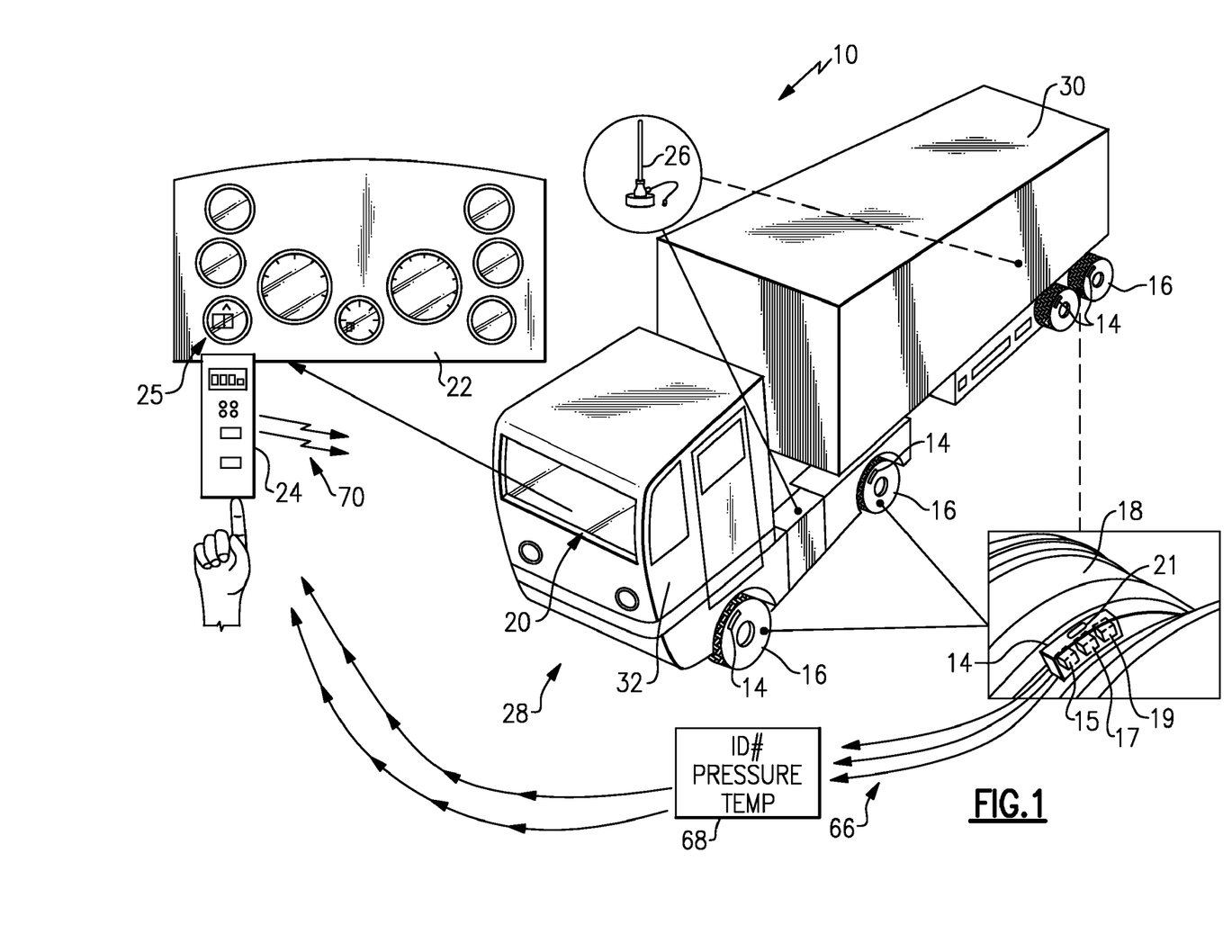
FIG. 1 is a schematic illustration of a vehicle including the example tire pressure monitoring system.

Referring to FIG. 1, an example tire pressure monitoring system 10 includes a plurality of tire pressure monitoring devices 14 mounted within rims 18 of each of the tires 16 that communicate with a handheld receiver 24 removeably mounted within a cradle 25 within the vehicle cabin 20. The handheld receiver 24 is removable to provide for data gathering and tire condition monitoring outside the vehicle 28.

The Tire pressure monitoring devices 14 includes a sensor 17 that senses and provides data indicative of conditions within the tire. The example tire pressure monitoring device 14 also includes a transmitter 15 for transmitting signals 66 to the hand held receiver 24. The tire pressure monitoring device 14 also includes a controller 19 for operating the sensor and transmitter and for storing identification information. A power source 21 provides power to the various components of the tire pressure monitoring device 14.

The conditions within the tire 16 can include pressure, temperature and changes in temperature and pressure over specific period of time. As appreciated, other information as is desired may also be gathered to communicate and monitor conditions in the tire.

The example illustrated motor vehicle 28 includes a tractor 20 pulling a trailer 30. The tractor 20 includes front wheels and a plurality of rear wheels and the trailer 30 includes a dual wheel, dual axle configuration. The number of tires 16 within the example vehicle 28 makes it difficult and tedious to maintain and update location information corresponding to each tire and tire pressure monitoring device 14. The example system does not require updated knowledge of the location of each tire pressure monitoring device 14.

The handheld receiver 24 is supported within the cradle 25 that is installed within a dashboard 22 of the motor vehicle 28. An antenna 26 communicates signals 66 from each of the tire pressure monitoring devices 14 to the cradle 25 and in turn to the handheld receiver 24. Each signal 66 from the tire pressure monitoring devices 14 includes several items of data 68. The items of data 68 include an identification number, pressure within the tire and temperature within the tire, along with any other desired information such as time and frequency of sensor readings. This data is communicated to the hand held receiver 24 through connections with the cradle 25.

Figure 2:
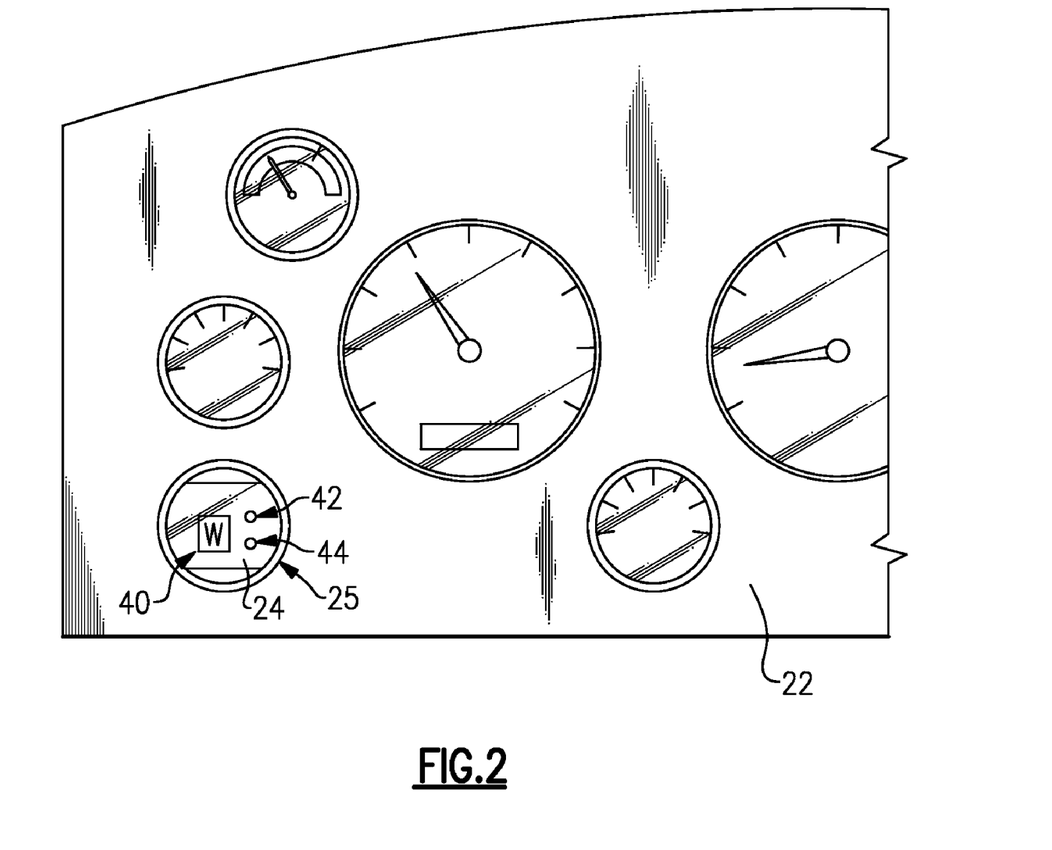
FIG. 2 is a schematic illustration of a dashboard including the cradle supporting the handheld receiver.
Figure 3A:
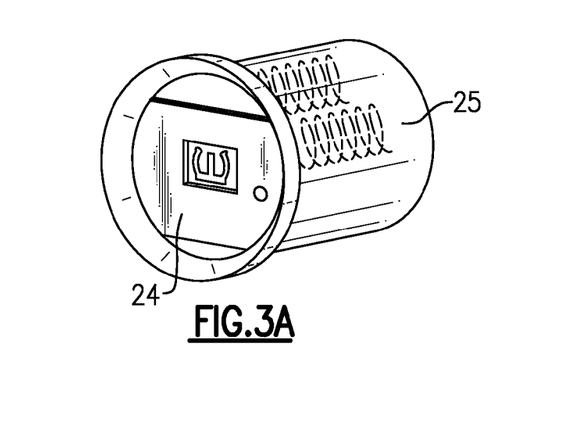
FIGS. 3A-3D are a sequence of illustrations showing the removal of the handheld receiver from a cradle device mounted in the dashboard.
Figure 3B:
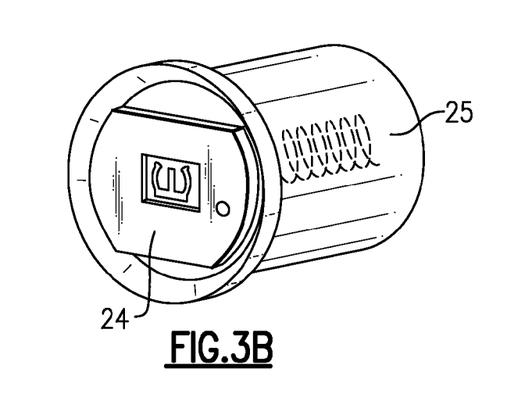
Figure 3C:
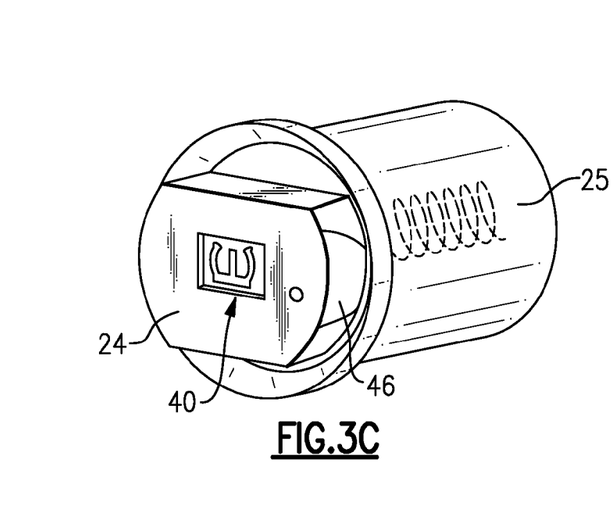
Figure 3D:
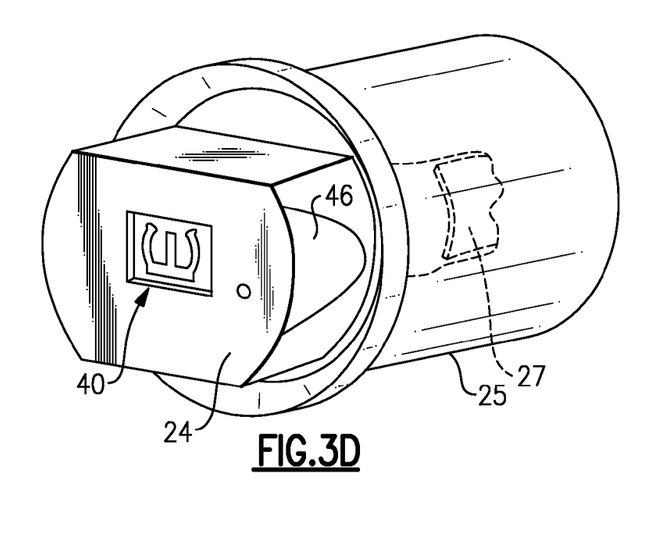

Referring to FIG. 2, during operation of the vehicle, the handheld receiver 24 remains within the cradle 25 mounted within the cabin of the vehicle. In the disclosed example the cradle 25 is mounted within the dashboard 22 of the motor vehicle 28. Other mounting locations are possible and within the contemplation of this invention.

While the handheld receiver 24 is mounted within the cradle 25, only a warning display 40 is visible. The warning display 40 includes an illuminatable display 40 that alerts an operator of an undesired condition within the tires 16. The warning display also includes status lights 42, 44. The status lights 42 can provide green or red status indicators that alert the driver to a condition within the tires. The conditions that are communicated will include select simple situation relevant information depending on the severity of the situation. For example, one sequence of illumination of the status lights 42, 44 can indicate simple out of range conditions, where another sequence indicates possible blowout conditions that could immediately affect vehicle operation.

Referring to FIGS. 3A-3D, once a condition within one of the tires is determined to be outside desired parameters, the operator will remove the handheld device 24 from the cradle 25. Removal of the example handheld device 24 from the example cradle 25 requires pushing in on the handheld receiver 24 to disengage a locking mechanism (schematically indicated at 27) within the cradle 25. The handheld receiver 24 is then pulled free of the cradle 25 utilizing finger grips 46 for removal of the handheld device from the cradle.

Figure 4:
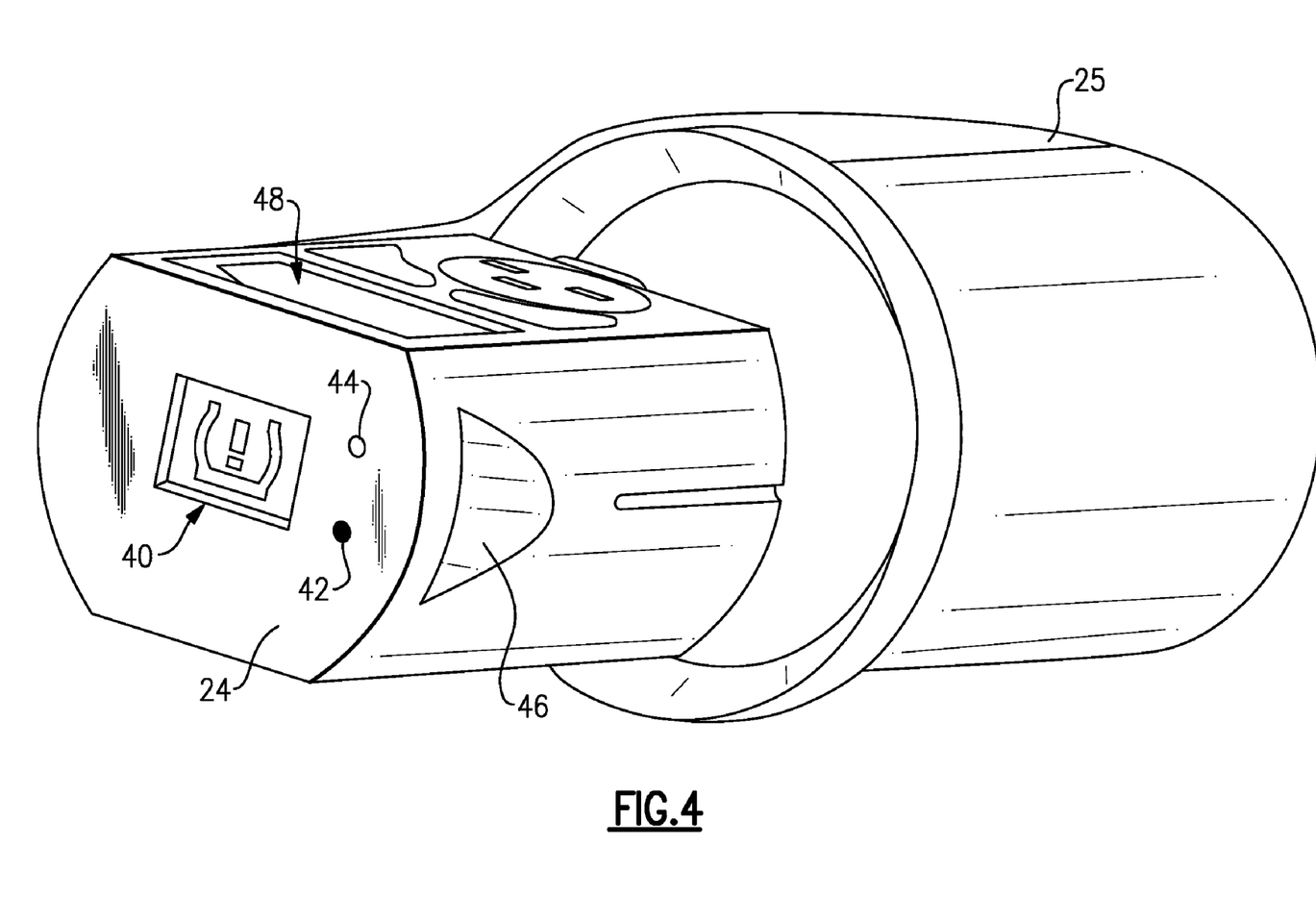
FIG. 4 is an example view of the handheld receiver being removed from the cradle.

Referring to FIG. 4, the handheld receiver 24 is removed from the cradle 25 and operates on battery power by batteries supported within the handheld device 24 (not shown). Upon removal of the handheld receiver 24 from the cradle 25, a primary display 48 is revealed. The primary display 48 communicates specific detailed information of the system and from information received from the tire pressure monitoring devices 14.

Figure 5:
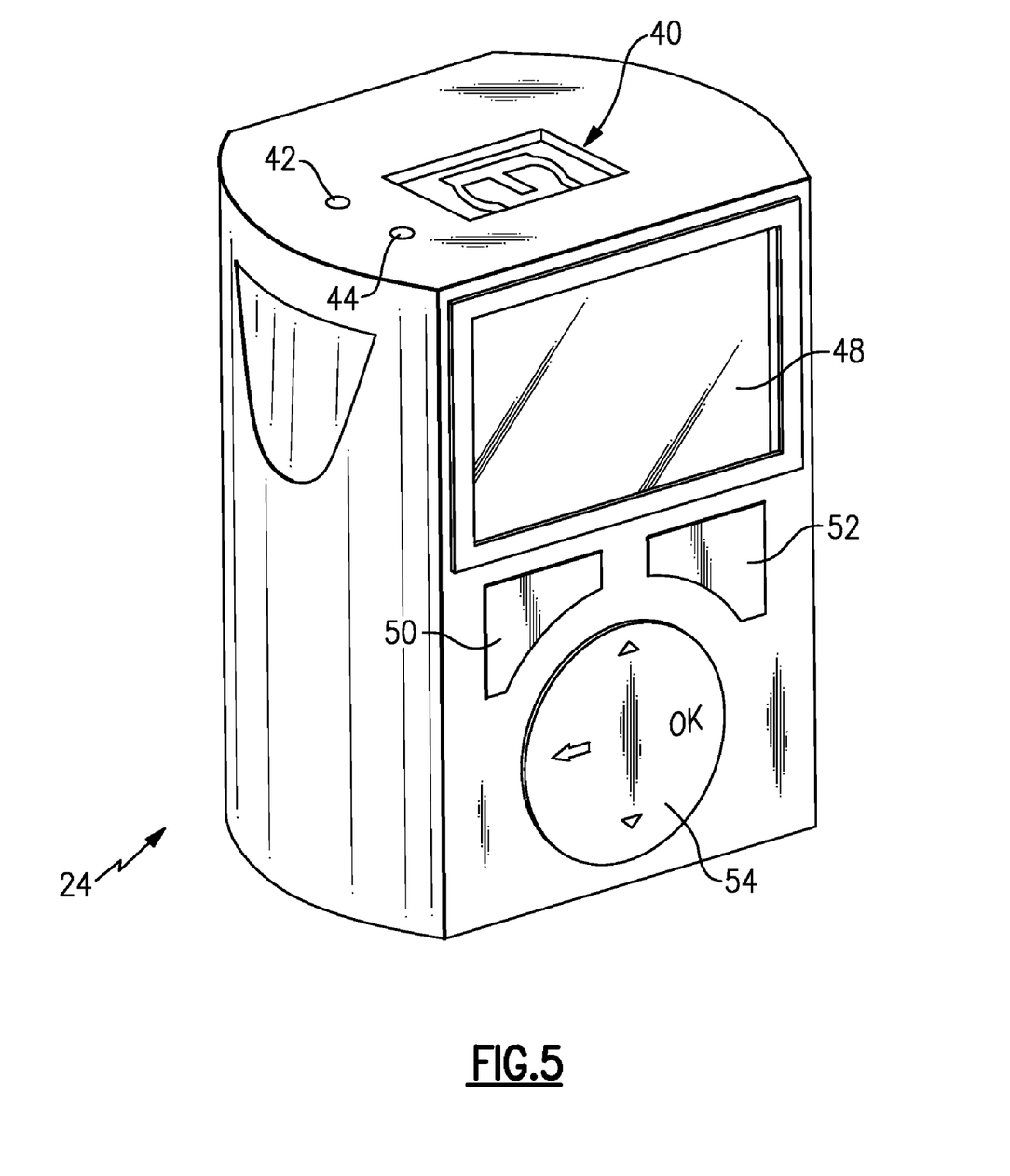
FIG. 5 is a perspective view of an example handheld receiver.

Referring to FIG. 5, the example handheld receiver 24 includes the warning display 40 and indicating lights 42, 44 and is visible when supported in the cradle 25. The primary display 48 is an LCD or other electronic display that communicates detailed information and instructions to an operator. The handheld device 24 includes buttons 50, 52, and 54 that provide an input means for navigating through menus and other displayed information. Further, the buttons 50, 52, and 54 also provide for operation of the handheld receiver 24 to prompt transmissions from the various tire pressure monitoring devices 14. As appreciated, the specific features and format of the buttons 52, 54 may be changed to accommodate applications specific conditions and requirements.

Referring to FIG. 1 with continuing reference to FIG. 5, the handheld receiver 24 continually receives transmissions 66 from each of the tire pressure monitoring devices 14. The transmissions 66 are RF signals that are received through the antenna 26 and then directed to the handheld receiver 24. The transmissions 66 include tire pressure and other information including an identification code that is unique to each tire pressure monitoring device 14. The information is evaluated and communicated to the vehicle operator.

With the handheld receiver 24 mounted within the cradle 25, only the warning display is visible. The warning display provides the information needed while operating the vehicle. As appreciated while operating the vehicle, specific detailed information for each tire is not required. All that is required is a status and a warning for any conditions that may immediately impact vehicle drivability. A tire pressure that is only a small amount out of range and that does not require immediate action may cause one sequence of illuminated status lights 42, 44. A more immediate problem could cause another sequence of illuminated status lights 42, 44 accompanied by an audible alarm to attract attention and communicate a relevant urgency of current tire conditions.

In the event that an undesirable tire condition is communicated to the handheld receiver 24, the identification code corresponding to the specific one of the tire pressure monitoring devices is stored for latter comparison. Normally, the identification codes are not stored as they are not required when conditions are within desired parameters.

When the operator decides to take corrective action in response to the out of range conditions is the time when more detailed information on tire location and specific out of range conditions is required. The operator removes the handheld receiver 24 from the cradle 25 and leaves the vehicle cabin 20. Outside the vehicle 28, the operator actuates the handheld receiver to cause transmission of a low frequency (LF) prompt signal 70. The prompt signal 70 is directed within a local area toward those tires adjacent the handheld receiver 24.

For a vehicle with four tires, the process is straight forward. The operator moves to the first tire and holds the handheld receiver 24 adjacent the first tire while emitting the prompt signal 70. The tire pressure monitoring device 14 in that tire responds with data including the identification code. If the received identification code matches the previously stored identification code, the operator has located the problematic tire. If the identification code does not match the operator moves to the other tires repeating the process until the problematic tire is located.

Figure 6:
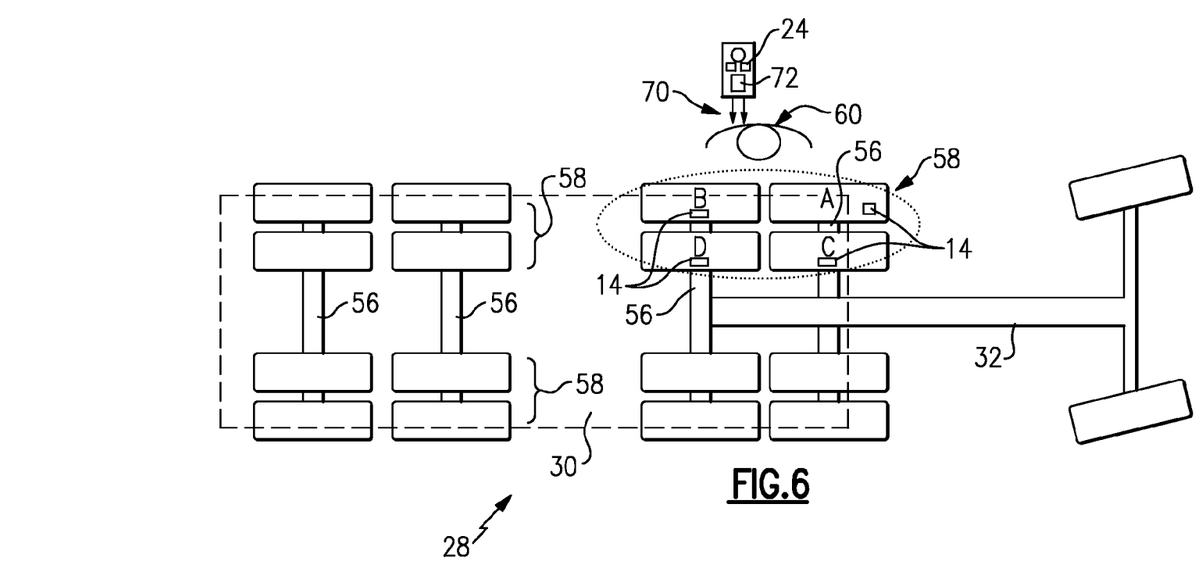
FIG. 6 is a schematic illustration of the method for determining a location of a specific tire pressure monitoring device.
Figure 7:
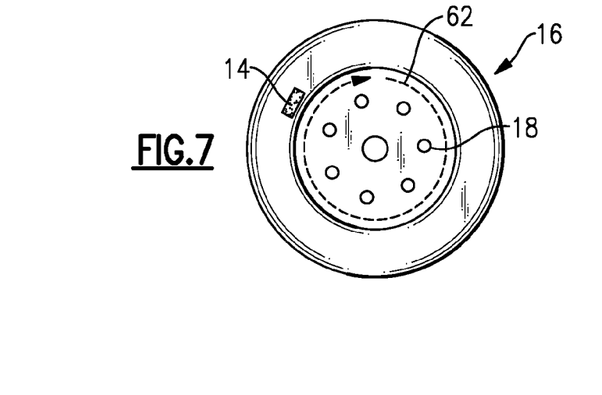
FIG. 7 is a schematic illustration illustrating the method of determining the specific position of a tire.

Referring to FIGS. 6 and 7, with continuing reference to FIG. 1, a vehicle with multiple axles 56 that include multiple wheels 58 requires some additional evaluations. The handheld receiver 24 includes a signal strength indicator 72 that evaluates the signal strength received from multiple tire pressure monitoring devices 14. As appreciated, the hand held receiver 24 may receive four or more transmissions when held adjacent dual wheeled axles 56. Additional steps are therefore required to determine the position of each tire pressure monitoring device 14 in the group of dual axle, dual wheel configurations.

The process includes the step of emitting the prompt signal 70 from the handheld receiver 24 adjacent one of the outside tires while tracing a circle following the edge of the rim 18 of the tire 16 (FIG. 7). This process is repeated on the adjacent outer wheel on the other axle. The handheld receiver 24 will receive signals from each of the tire pressure monitoring devices 14 on each axle and evaluate the signal strength of each transmission relative to the other received signals. Together with the received identification codes, the handheld receiver will determine which of the tires in that group has the problem.

When the operator traces a circle in the air with the handheld receiver 24 the signal strength coming from each of the responding tire pressure monitoring devices 14 is measured and compared to each other. The handheld receiver matches the signal strength to a particular sensor identification code that has been stored upon the initial indication of some problem within one of the tires.

Somewhere along the trace circle 62 (FIG. 7), the signal strength from each tire pressure monitoring device 14 will reach a peak value. Depending where on the vehicle rim the tire pressure monitoring device 14 is mounted that peak value and the peak-to-peak amplitudes of the signal strength of the corresponding sensors will be utilized to determine to which tire position the problematic tire pressure monitoring device 14 corresponds. The closest source comes from the tire pressure monitoring device 14 mounted on the outer wheel of the axle 56. The user can repeat this procedure for each adjacent axle utilizing the handheld receiver 24.

Figure 8:
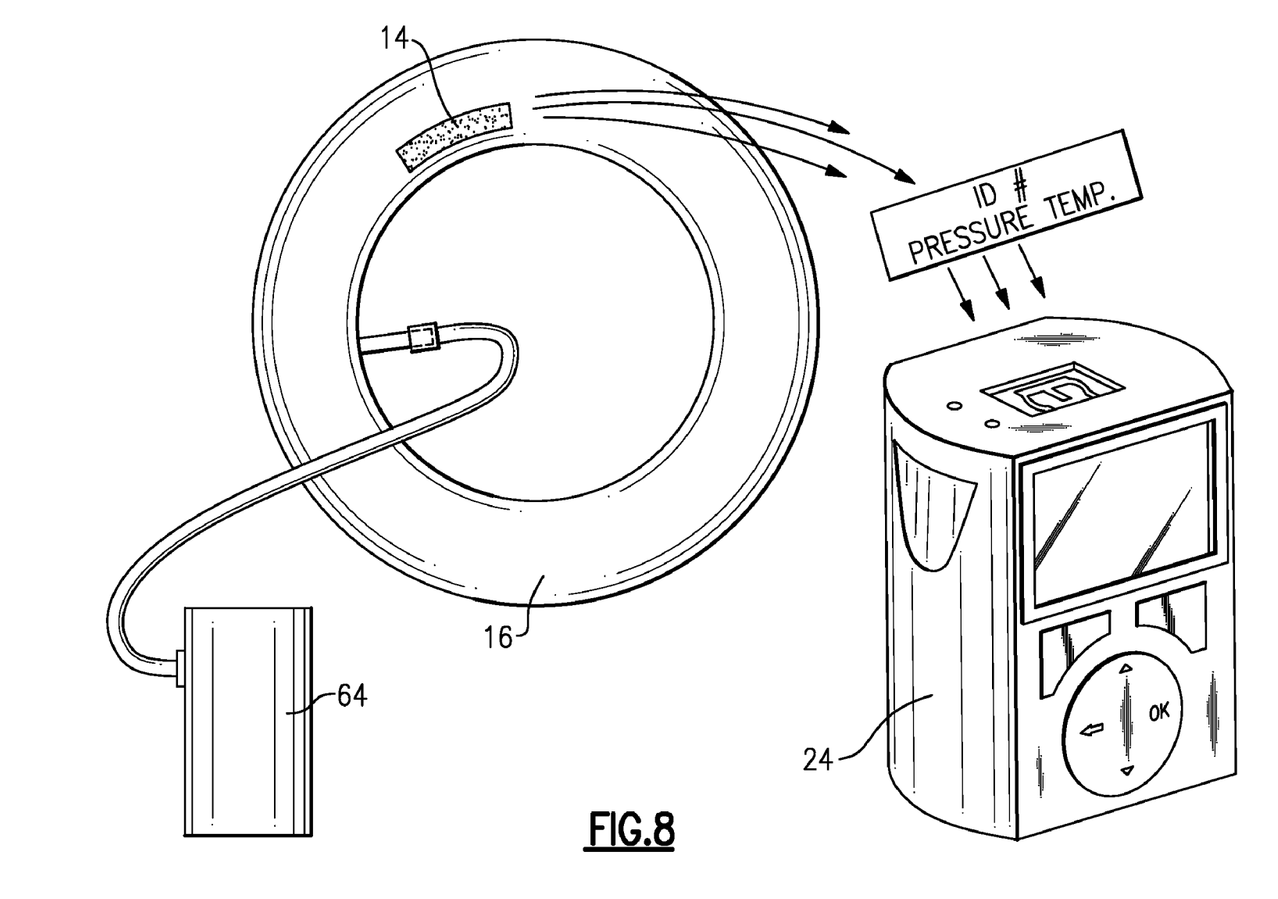
FIG. 8 is a schematic illustration of the example handheld receiver being utilized to inflate a tire to a proper inflation level.

Referring to FIG. 8, another application utilizing the tire pressure monitoring devices 14 and the handheld receiver 24 includes remotely monitoring tire pressure during inflation. Tire pressure within a vehicle is conventionally measured through the use of a mechanical pressure gauge that is attached to the air valve. The mechanical pressure gauge shows the tire pressure without any compensation for temperature. Accordingly, during filling of the tire, an air source is attached to a fill valve where pressure is injected into the tire. The air hose must then be disconnected from the tire and the mechanical tire pressure gauge be reengaged to determined if the pressure within the tires. This process is repeated several times until the pressure in the tire is as desired. As appreciated, this does not compensate for temperature and therefore can result in pressure within the tire being over or under inflated once the tire pressure reaches specific operating temperatures.

The example system 10 utilizes the handheld receiver 24 as a remote temperature compensated tire pressure gauge. In this way the value of temperature compensated value of pressure within the tire can be viewed and utilized instead of the non-compensated pressure during the entire filling process. The handheld receiver 24 is actuated to emit the prompt signal 70 to the adjacent tire pressure monitoring device 14 within the tire 16. The primary display 48 displays pressure within the selected tire 16 that is compensated within the current temperature. Once the desired pressure has been reached within the tire 16 the hose can be disconnected and the tire 16 is assured to be pressurized properly regardless of current temperature. This process does not require continual connecting and disconnecting of a mechanical device that does compensate the tire pressure readout for the current temperatures.

This solution allows the user to leave the air supply connected to the air valve by measuring the pressure on the handheld receiver 24. This makes the inflation process faster and more accurate. Further, the temperature compensated pressure reading that is already included and available from the tire pressure monitoring device 14 is available due to the handheld and portable nature of the handheld of the receiver of this example invention.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A system for monitoring conditions within a tire comprising:
    a plurality of tire pressure monitoring devices mounted in a corresponding plurality of tires;
    a hand held receiver for receiving transmissions from each of the plurality of tire pressure monitoring devices indicative of tire conditions, the receiver including a warning display and a primary display that is separate from the warning display; and
    a cradle for supporting the hand held receiver within a vehicle cabin, wherein the cradle receives the hand held receiver such that the warning display is viewable when installed within the cradle and the primary display is not viewable when installed within the cradle, and the primary display is only viewable when separated from the cradle.

2. The system as recited in claim 1, including an antenna for receiving signal from each of the plurality of tire pressure monitoring sensors communicating with the hand held device through the cradle.

3. The system as recited in claim 1, wherein the warning display communicates warning information to a vehicle operator not specific to any one of the plurality of tire pressure monitoring devices, where the warning information includes an indicator communicating a first state indicating that tire conditions are within an acceptable range and a second state indicating that tire conditions are outside the acceptable range.

4. The system as recited in claim 1, wherein the primary display communicates detailed information selectable by the operator through at least one button accessible upon removal of the hand held receiver from the cradle.

5. The system as recited in claim 4, wherein the detailed information includes a real time temperature compensated tire pressure value.

6. The system as recited in claim 1, wherein the hand held receiver includes a low frequency transmitter for prompting transmission of data from one of the plurality of tire pressure monitoring devices.

7. The system as recited in claim 1, wherein the hand held receiver includes a signal strength indicator for determining signal strength of the transmission from a corresponding one of the plurality of tire pressure sensors.

8. The system as recited in claim 7, wherein the hand held receiver utilizes the signal strength indicator to match a location of one of the plurality of tires with one of the plurality of transmissions indicative of tire conditions by matching a signal strength with a location of the transmitter.

9. The system as recited in claim 1, wherein the cradle supplies power to the hand held receiver when supported within the cradle.

10. The system as recited in claim 1, wherein the cradle comprises a cavity defining an inner space that receives the hand held receiver and a locking mechanism for holding the hand held receiver within the cradle such that only the warning display is visible from within the vehicle cabin.

11. The system as recited in claim 10, wherein the locking mechanism comprises a catch that is engaged upon receiving the hand held receiver and disengaged responsive to an inward push of the hand held receiver.

12. The system as recited in claim 1, wherein the hand held receiver includes a first surface including the warning display and a second surface transverse to the first surface that includes the primary display.

13. The method as recited in 12, including the step of releasing the hand held device from a locking mechanism holding the hand held device within the cradle by pushing inwardly on the hand held device such that the hand held device moves outwardly from the inner cavity.

14. A method of monitoring and evaluating conditions within a tire mounted to a vehicle comprising the steps of:

a) transmitting a signal indicative of conditions within a tire with a tire pressure monitoring device within each tire of the vehicle;
b) receiving the signal indicative of conditions within a tire with a hand held receiver received within a cradle within a cabin of the vehicle;
c) initiating a warning signal on a warning display of the hand held receiver that is viewable when received within the cradle in response to a signal indicating undesired conditions within a tire of the vehicle; and
d) removing the hand held device from the cradle and viewing detailed information relating to a received signal indicative conditions within a tire of the vehicle on a primary display that is separate from the warning display and viewable only upon removal from the cradle.

15. The method as recited in claim 14, including the step of determining a specific one of the vehicle tires from which the signal indicative of conditions within the tire is received by emitting a prompt signal from the hand held receiver while holding the hand held receiver adjacent at least one of the vehicle tires.

16. The method as recited in claim 14, including the step of determining a location of a specific one of the tire pressure monitoring devices by measuring a received signal strength of each transmission with the hand held receiver and assigning a position on the vehicle responsive to the received signal strength.

17. The method as recited in claim 16, wherein the step of determining a location of a specific one of the tire pressure monitoring devices for an axle including more than one wheel includes moving the hand held receiver relative to the wheels on the axle and receiving transmissions from tire pressure monitoring devices from wheels on the axle.

18. The method as recited in claim 14, including the step of inflating a tire to a desired pressure by prompting a signal indicative of a temperature compensated tire pressure for the tire with the hand held device and displaying the temperature compensated pressure on the secondary display.

19. The method as recited in claim 14, wherein the location of each of the tire pressure monitoring sensors is not stored in the hand held receiver.

20. The method as recited in claim 14, including storing an identification code corresponding to one of the tire pressure monitoring devices communicating a signal indicative of undesired tire conditions.

21. The method as recited in claim 20, including prompting transmission of a signal from the tire pressure monitoring device and comparing a received identification code with the stored identification code and determining the location of the tire corresponding to the signal indicative of undesired conditions responsive to a match between the stored identification code and the received identification code.

22. The method as recited in claim 14, including the step of locking the hand held receiver within an inner cavity of the cradle such that only the warning display is visible within the vehicle cabin.

* * * * *